United States Patent [19]
Martin

[11] 3,792,203
[45] Feb. 12, 1974

[54] AUTOMATIC REDIAL MEMORY DEVICE FOR TELEPHONES

[75] Inventor: David B. Martin, Cumberland, R.I.

[73] Assignee: Honeywell Information Systems, Inc., Waltham, Mass.

[22] Filed: Mar. 10, 1972

[21] Appl. No.: 233,647

[52] U.S. Cl. .............................. 179/90 B, 179/90 B
[51] Int. Cl. .............................. H04m 1/44
[58] Field of Search ........... 179/90 B, 90 BB, 90 BD

[56] References Cited

UNITED STATES PATENTS

| | | | |
|---|---|---|---|
| 3,670,111 | 6/1972 | Bukusky | 179/90 B |
| 3,555,201 | 1/1971 | Kuehnle et al. | 179/90 B |
| 3,531,599 | 12/1967 | Bodie | 179/90 BD |
| 3,135,834 | 6/1965 | Shuji et al. | 179/90 B |

*Primary Examiner*—Kathleen H. Claffy
*Assistant Examiner*—Gerald Brigance
*Attorney, Agent, or Firm*—Nicholas Prasinos; Ronald T. Reiling

[57] ABSTRACT

An automatic redial memory device for use with the telephone system which electronically stores a previously dialed number and then subsequently retransmits that number via the telephone apparatus, either on a timed interval basis or at random times upon the activation of an appropriate select switch. A plurality of shift registers comprise a module register which stores a plurality of dialed telephone numbers comprising a telephone address. Selection circuitry permits the transmission and/or retransmission of the stored numbers at predetermined intervals or at random times by enabling selected ones of a plurality of AND gates to provide transmission pulses.

19 Claims, 7 Drawing Figures

AUTOMATIC REDIAL MEMORY DEVICE FOR TELEPHONES

BACKGROUND OF THE INVENTION

1. Field of the Invention

This invention relates generally to automatic dialing apparatus, and more particularly to a method and apparatus for the automatic dialing of a predetermined telephone address at random or predetermined time intervals.

2. Description of the Prior Art

There are many applications where it is desirable to dial a preselected telephone number merely by pressing a button, and to redial that number at preselected time intervals if a connection is not made with the telephone address dialed. For example, credit verification may be made by a merchant of a customer requesting credit by automatically establishing a telephone link to a central computer located at a remote station and querying the computer relative to the custormer's credit. Another example of automatically establishing a telephone link to predetermined telephone address is for hotel reservations from a courtesy telephone station at a railroad station or airport. To perform these exemplary services, it was formerly required that the telephone number be dialed digit-by-digit or by use of a card storage device or tape to store numbers to be dialed or in the alternative that a dedicated telephone line couple the interrogated station with the interrogating station. Of course such a dedicated telephone line would be expensive and inefficient because of a relatively low utilization load. A preferable technique is to automatically couple into the switching network of the telephone system and automatically dial the telephone address desired.

One technique for accomplishing this result is described in an article by C.H. Eubank entitled *Programmed One-Number Telephones Place Calls Automatically* and published in the Bell Laboratories Record on May, 1971. This technique entails an electromechanical technique wherein an installer, programs the memory by positioning 14 slide switches on the preset dial unit. With the memory thus conditioned, the dial sequentially steps through the 14 digit program when the caller pushes a button on the telephone thus generating the appropriate signals for automatic dialing. However, this technique requires installation by a trained installer and the memory is not readily changed and programmed by the user.

Another technique for automatic dialing is described in U.S. Pat. No. 3,592,973, issued July 13, 1971. In this technique, code cards in which an array of apertures are punched and represent information that is used for data storage and retrieval. This card is used in a cooperative automatic telephone system to dial the number encoded in the card. This system has the drawback that it requires a card precoded with the telephone number to be dialed and is not suitable for applications where it is required to dial and redial a given number which the user may want to change at will without resorting to separate apparatus for precoding blank cards.

What is desired is a device that will function on any telephone and which when activated automatically dials and/or redials at predetermined time intervals a prestored number and which does not require the preoccupation of the user. Moreover, prestoring of the number to be dialed should be simple and easily performed by the user without resort to professional adjustments or to punched or magnetic cards or tapes.

SUMMARY OF THE INVENTION

Briefly, the invention herein disclosed comprises an automatic redial device for use with the telephone communication system, which electronically stores a predetermined number by activating a local memory and dialing the number into that memory. The stored number may then be automatically dialed at random or at predetermined time intervals by the activation of an appropriate select switch.

A plurality of shift registers comprise a module register which stores a plurality of dialed telephone numbers comprising a telephone address. Selection circuitry permits the transmission and/or retransmission of the stored numbers at predetermined intervals or at random by enabling selected ones of a plurality of AND gates to provide transmission pulses.

OBJECTS

It is an object of the instant invention to provide an automatic dialing device which automatically dials a predetermined number.

It is another object of the instant invention to provide an automatic dialing device which automatically dials a predetermined number and then redials that predetermined number at predetermined timed intervals.

It is still another object of the instant invention to provide an automatic dialing device for dialing a predetermined number wherein the predetermined number may be readily altered by the user.

These and other objects and advantages of the invention will become apparent from the following description of a preferred embodiment of the invention when read in conjunction with the drawings contained herewith.

DESCRIPTION OF A PREFERRED EMBODIMENT

Figure 1:
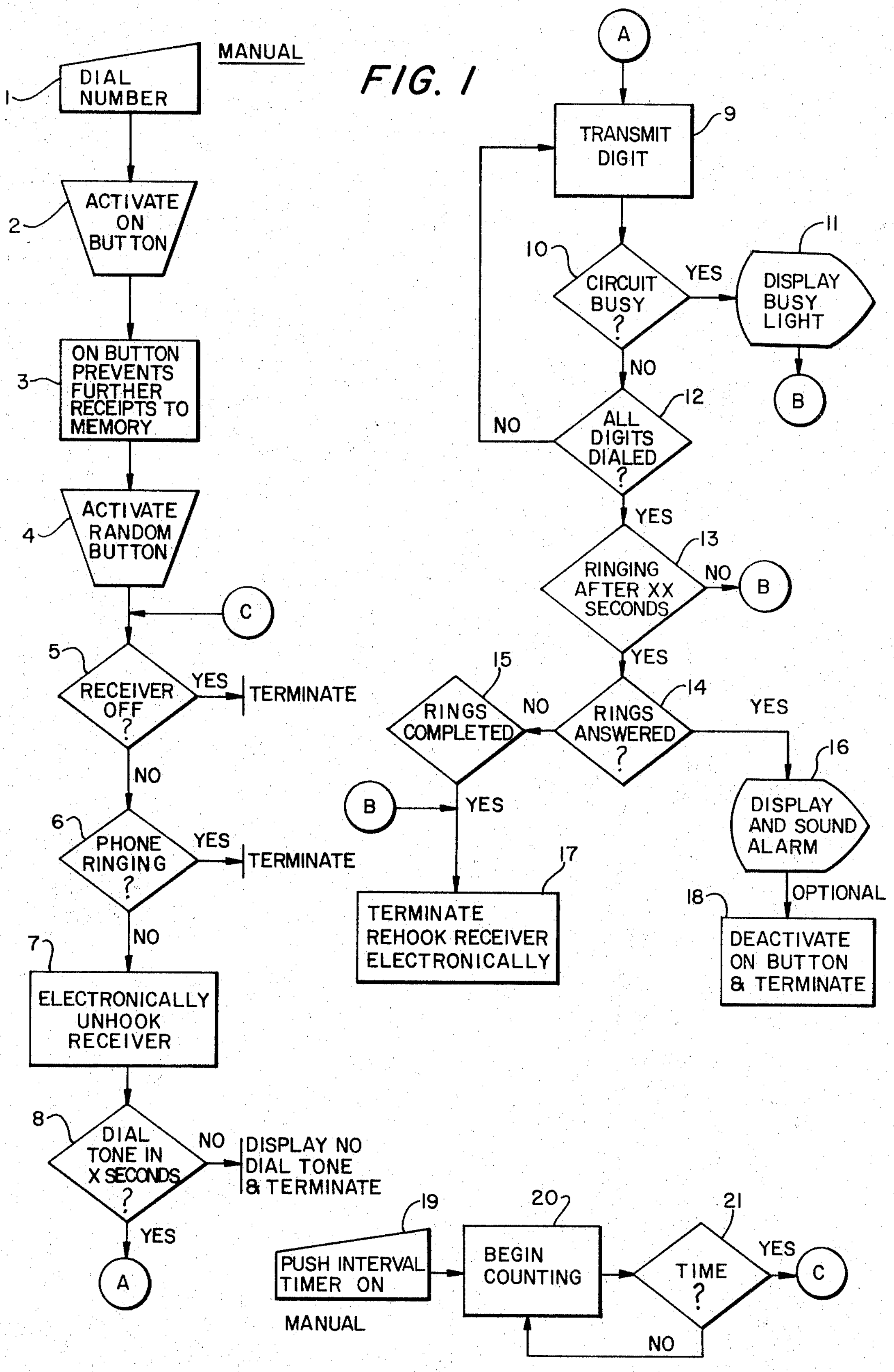
FIG. 1 is a flow diagram representing the functional activity of the automatic dialing steps.

Referring now to FIG. 1, the local memory of the invention (to be later described) is preset with a predetermined number by dialing the number, step 1. The number in local memory is saved for future use by activating a SAVE ON/OFF button, step 2; activation of the On button prevents further receipts to local memory when another number is manually dialed, step 3. If the user chooses to continue onto step 4, he activates the random button 31 on FIG. 2. By pressing the random button, the process of transmitting the number over the telephone line i.e., automatic dialing, begins provided that the local receiver is not off the line, step 5, and that the local phone is not ringing; moreover, before automatically transmitting the stored number the receiver must be electronically connected to the telephone switching network, step 7, and a dial tone received in $x$ seconds, step 8 where $x$ may be any predetermined number.

Automatic transmission of the predetermined number digit-by-digit is begun, step 9, but the telephone circuits are continuously monitored for busy circuits, step 10, and the automatic dialing process continues until the last digit is dialed if there are no busy signals on the telephone line, step 12. If a busy signal is detected, then a busy light is displayed, step 11. Note that after each digit is transmitted, the circuit is tested to determine whether or not there is a busy signal in the telephone circuit. After all of the digits of the telephone address are dialed, a check is made to determine if the telephone that was dialed is ringing, step 13, and if such ringing does not occur after a predetermined number $xx$ seconds, the automatic transmission terminates and the receiver is electronically disconnected. If on the other hand the phone dialed at the other end of the telephone line is ringing, the number of rings are monitored and if there is no answer within a predetermined amount of time the telephone is electronically disconnected from the telephone line and the automatic dialing process terminated, step 14. However, if the dialed telephone is answered at the other end of the telephone line, an alarm is sound and a visual display signals that the telephone has been answered, step 16, whereupon the SAVE ON/OFF button will be deactivated, step 18. An optional feature at this point is not to deactive the SAVE ON/OFF button automatically so that the number may be automatically dialed by others at some future time.

If after step 3 above, the user wants to have the stored number redialed at predetermined intervals he selects a predetermined interval by pressing an appropriate button 32, 33, 34, 35 or 36, step 19. An interval clock (to be later described) begins a timing cycle, step 20, and upon the end of each cycle of time, step 21, the above transmission cycle of the prestored number is commenced. This cycle will continue until it is manually terminated or the receiver of the telephone dialed is lifted off the hook thus completing the call.

Figure 2:
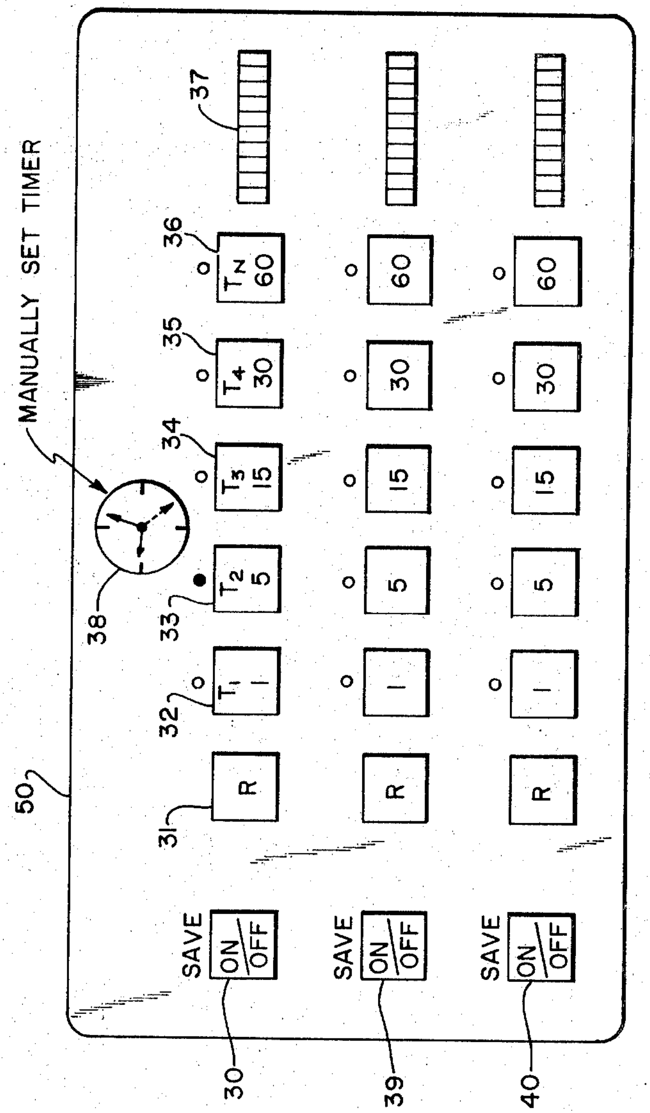
FIG. 2 is a schematic representation of the face of the invention.
Figure 5A:
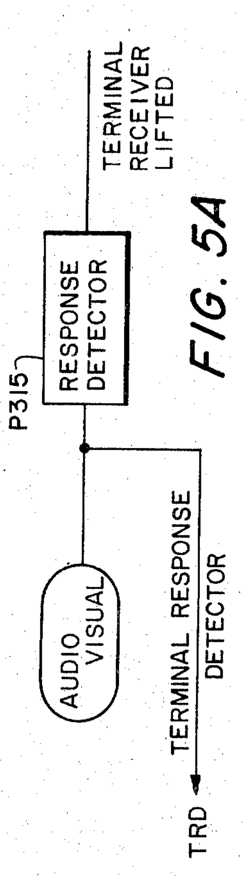
FIGS. 5 and 5A are logic block diagrams of the initiation and transmission logic circuitry of the invention.

Referring now to FIG. 2, there is shown on the face 50 of the instant invention three rows of push buttons, each row beginning with SAVE ON/OFF push buttons 30, 39 and 40, respectively. Each row represents a module which has its own local store memory (to be later described). At the end of each row there is a Nixi tube display 37 which represents the number stored in the local memory of that row. Although only three rows are shown here, the invention may be practiced with any number of rows according to the needs of the user and the models of the manufacturer. The face 50 of the device is the interface between the user and the automatic dialing and redialing circuitry. When the user wishes to place a number into the module memory unit (to be later described), he dials the desired number utilizing the dialing mechanism of a regular telephone and then presses the SAVE ON/OFF button 30. Whenever the user desires to automatically dial this stored number, he merely presses the R button 31. If the telephone that is dialed does not answer or is busy, he can press any of buttons 32, 33, 34, 35 or 36 to have the stored number automatically dialed in accordance with the time interval represented by those buttons. For example, if he presses push button 32, the stored number will be automatically dialed every minute; if he presses push button 33, the stored number will be automatically dialed every 5 minutes and so on with the remaining buttons. The number stored in the local memory module will be displayed in Nixi tube display 37. If on the other hand the user desires to have the number dialed at some specific time, then the manual timer 38 is set to the desired time for automatic dialing, he may also press buttons 32–36, FIG. 2 which will cause the number to be dialed to begin at a specific time and continue at the designated time interval.

Figures 3, 3A:
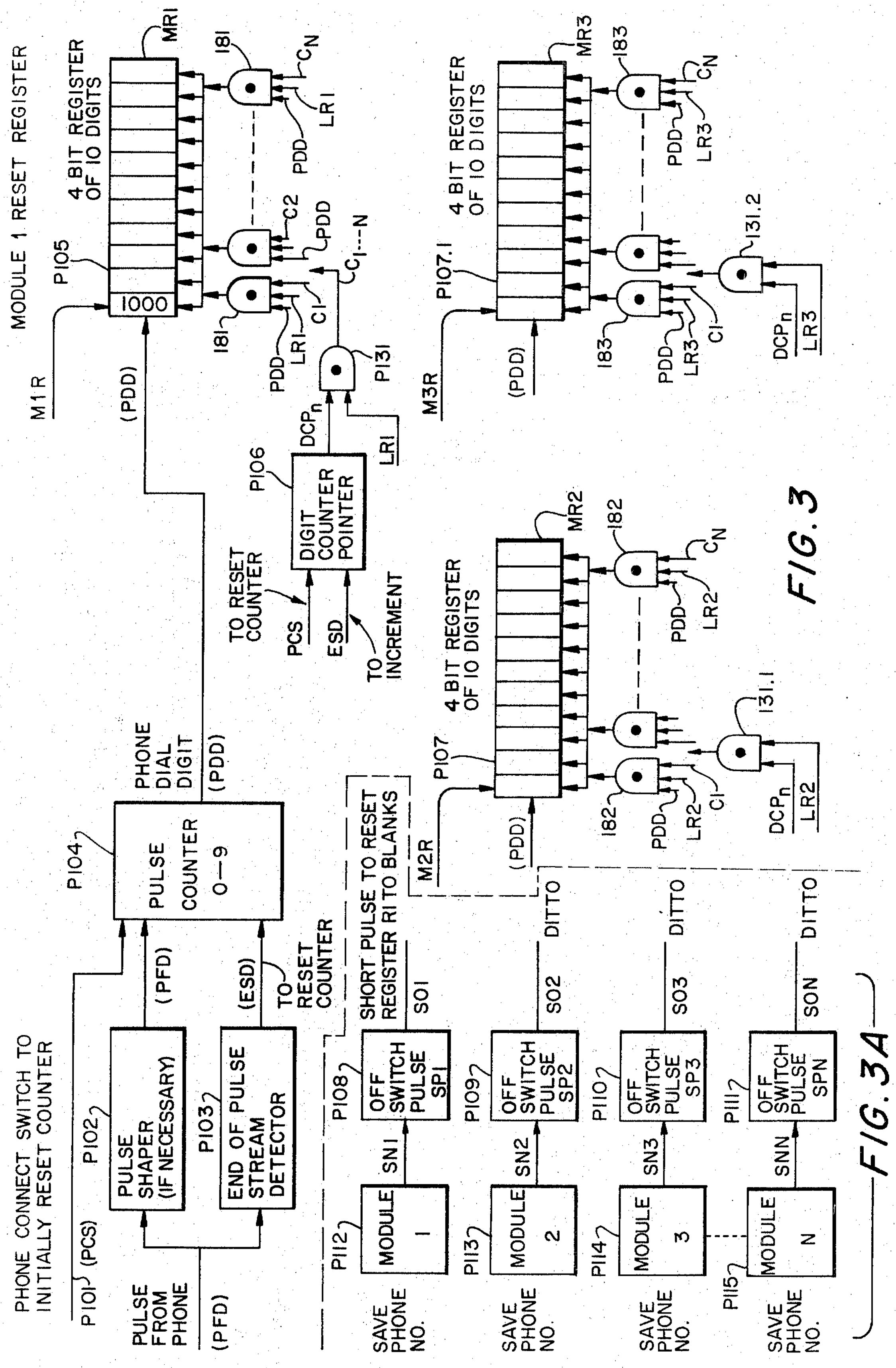
FIGS. 3 and 3A are logic block diagrams of the telephone number store cycle of the invention.

Referring now to FIGS. 3 and 3*a*, there is shown the logic circuitry for storing a desired number into an appropriate module register P105, P107 or P107.1. Each module register is comprised of eleven 4 bit shift registers, each shift register capable of storing a binary coded decimal number from 0000 to 1001, i.e., 0 to 9. When a user wishes to store a number in the appropriate module register, he lifts the telephone off its cradle which activates a phone connect switch which issues a (PCS) voltage signal on line P101 which voltage signal would be applied to pulse counter P104. This voltage signal resets pulse counter P104 to 0. Pulse counter P104 may be a four-level counter comprised of flip-flops or magnetic cores which is activated by a train of pulses and stores the equivalent binary coded decimal number in response to a given number of pulses. Hence, if 8 consecutive pulses are applied to the pulse counter P104, the flip-flops or magnetic cores of the counter would step through until the high order flip-flop is high i.e., stores a 1, and the remaining three lower order flip-flops store a 0, i.e., are low. The stream of pulses applied to the pulse counter P104 are derived from the number being dialed on the telephone and identified as (PFD). These pulses may be shaped in a pulse shaping circuit P102 but is not essential to the invention. Such pulse shaping circuits are well known in the art with typical ones being found in Chapter 5 of a book entitled Pulse Techniques by Sydney Moskowitz and Joseph Racker, published by Prentiss-Hall Inc., 1951. The stream of phone pulses (PFD) are also applied to an end of pulse stream detector P103 which detects the end of a series of pulses comprising a digit, because of a longer period of time between pulses or by activating a pulse marker switch (not shown) when a new digit is dialed. The digit dialed now temporarily stored in pulse counter P104 is transferred to the appropriate shift register of either module register P105, P107 or P107.1, through digit counter pointer P106. The (PCS) voltage signal present when the phone connect switch is activated is applied to digit counter pointer P106 and is utilized to reset the counter to 0. The end of pulse stream detector (ESD) signal is also applied to the digit counter pointer P106 which increments its count by one in response to this signal. The incremented count represented by signal $DCP_n$ is applied to AND gate P131, P131.1, and P131.2; also, there are provisions in the input of AND gates P131, P131.1, and P131.2, for the provision of signals LR1, LR2, LR3, respectively. When, for example, input signals $DCP_n$ and LR1 are applied to AND gate P131, a high output signal $C_1 \ldots N$ results depending on which count the digit counter pointer P106 has completed. The $C_1 \ldots N$ signal is applied to AND gate 181 together with the PDD signal and the LR1 signal to enable the appropriate 4 bit shift register to receive that particular digit in binary coded decimal. This process is repeated for the remaining 4 bit shift registers of the module register $MR_1$ until the desired number is stored in the module register MR1. The process is similar for storing numbers in module registers MR2 and MR3, P107, P107.1. The Boolean expressions for the switching relations are expressed as follows:

$LR1 = \overline{SN1}$
$LR2 = SN1 \cdot \overline{SN2}$
$LR3 = SN1 \cdot SN2 \cdot \overline{SN3}$
LRn = same pattern.
$M1R = SO1 + \overline{PSC} \cdot \overline{SN1}$
$M2R = SO2 + \overline{PCS} \cdot \overline{SN2}$
$M3R = SO3 + \overline{PCS} \cdot \overline{SN3}$
$MnR = SOn + \overline{DCS} \cdot \overline{SN4}$.

The above symbols of the Boolean expressions refer to voltage signals as previously discussed with FIG. 3 or with voltage signals to be discussed with FIG. 3*a* below.

Referring to FIG. 3*a* there are shown SAVE ON/OFF module push buttons P112, P113, P114, and P115. These correspond to the module SAVE push buttons 30, 39, and 40 of FIG. 2 except more modules are shown on FIG. 3*a*. These module SAVE buttons switch on/off switch units P108, P109, P110, and P111, by applying a signal SN1, SN2, SN3, or SNn to the appropriate switch P108-P111, respectively. The switches P108-P111 may be nothing more than flip-flops comprised of semiconductors or electronic tube circuits. When respective ones of these switches are high, they have a high output signal identified as SO1, S02, SO3, and SOn, and conversely when they are low, this voltage signal is not present. The function of the SO1-SOn signals is to set their respective associated module registers to 0 so that another number may be stored in the respective module register. Therefore, should one wish to discontinue the saving of a particular number in module register MR1, the off push button P112 is pressed providing a high SO1 signal.

Figure 4:
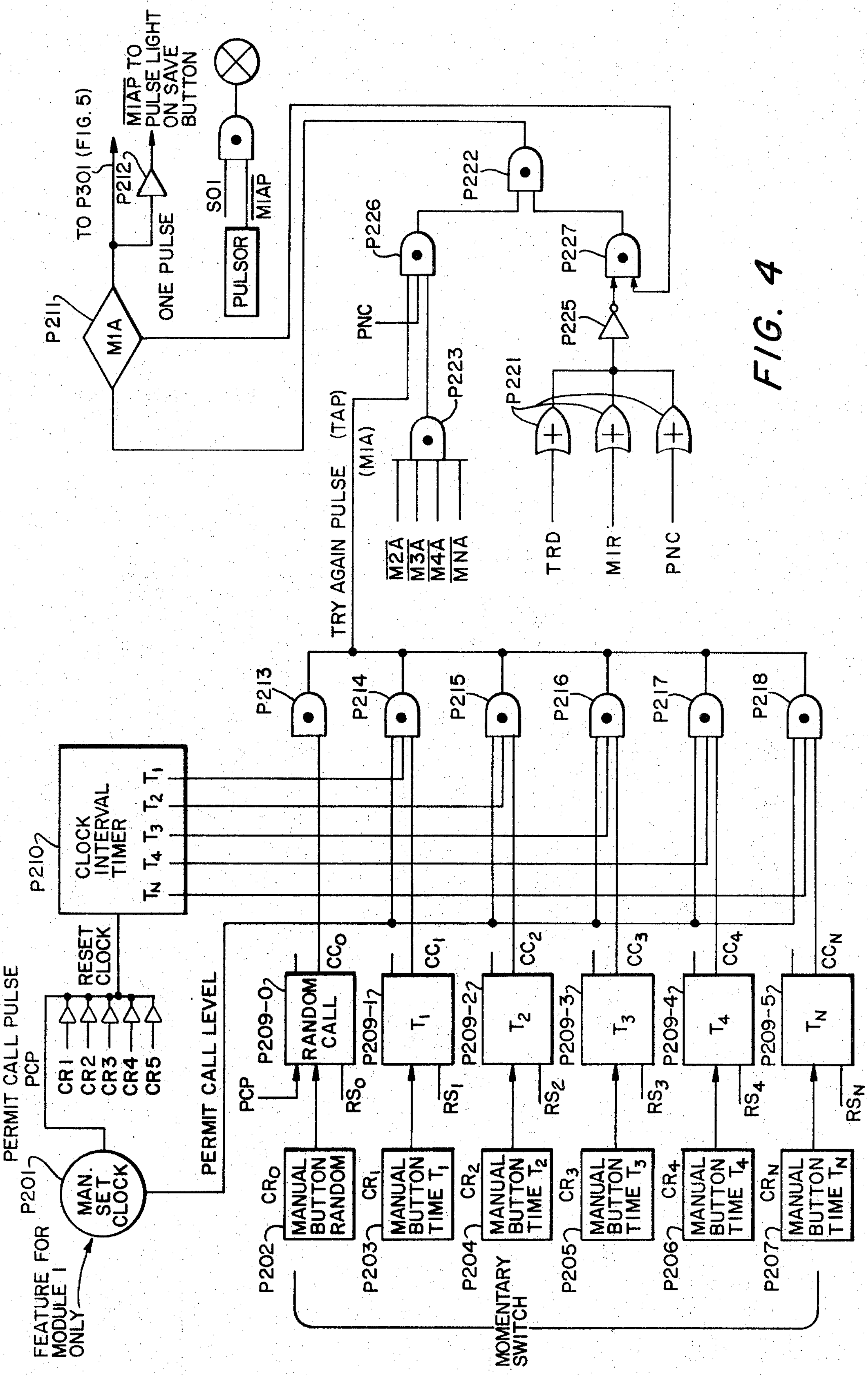
FIG. 4 is a logic block diagram of the call control logic circuitry of the invention.

Referring now to FIG. 4, there is shown the call control logic for one module; other modules would have similar call control logic circuitry. Manual push buttons P202–P207 correspond to time push buttons 31–36 of FIG. 2. By pressing any one of these push buttons a corresponding flip-flop P209–0 through P209–5 is activated or inactivated depending on the prior position of the flip-flop, i.e., one of the output terminals of a flip-flop is coupled to an input terminal of a corresponding AND gate, and this terminal assumes a high state or a low state depending on the prior status of the flip-flop. Moreover, each AND gate with the exception of P213 has one of its input terminals coupled to an output terminal T1, T2, T3, T4, or TN of clock interval timer P210. Each terminal $T1\text{-}T_N$ of clock interval timer P210 goes high at different intervals of time. In addition, each of said AND gates P214–P218 with the exception of AND gate P213 has another of its input terminals coupled to the manual set clock P201 and provides a high signal when the manual set clock P201 is set to zero. Pulse signals PCP and CR1-CR5 are reset signals for the clock interval timer P210 and are activated to reset the clock interval timer P210 when manual push buttons P202 – P208 are pressed. In addition, the clock interval timer P210 is also reset by PCP reset signal initiated when the manual set clock P201 is set to a specified time. (Manual set clock P201 corresponds to manual set timer 38 of FIG. 2).

Figure 5:
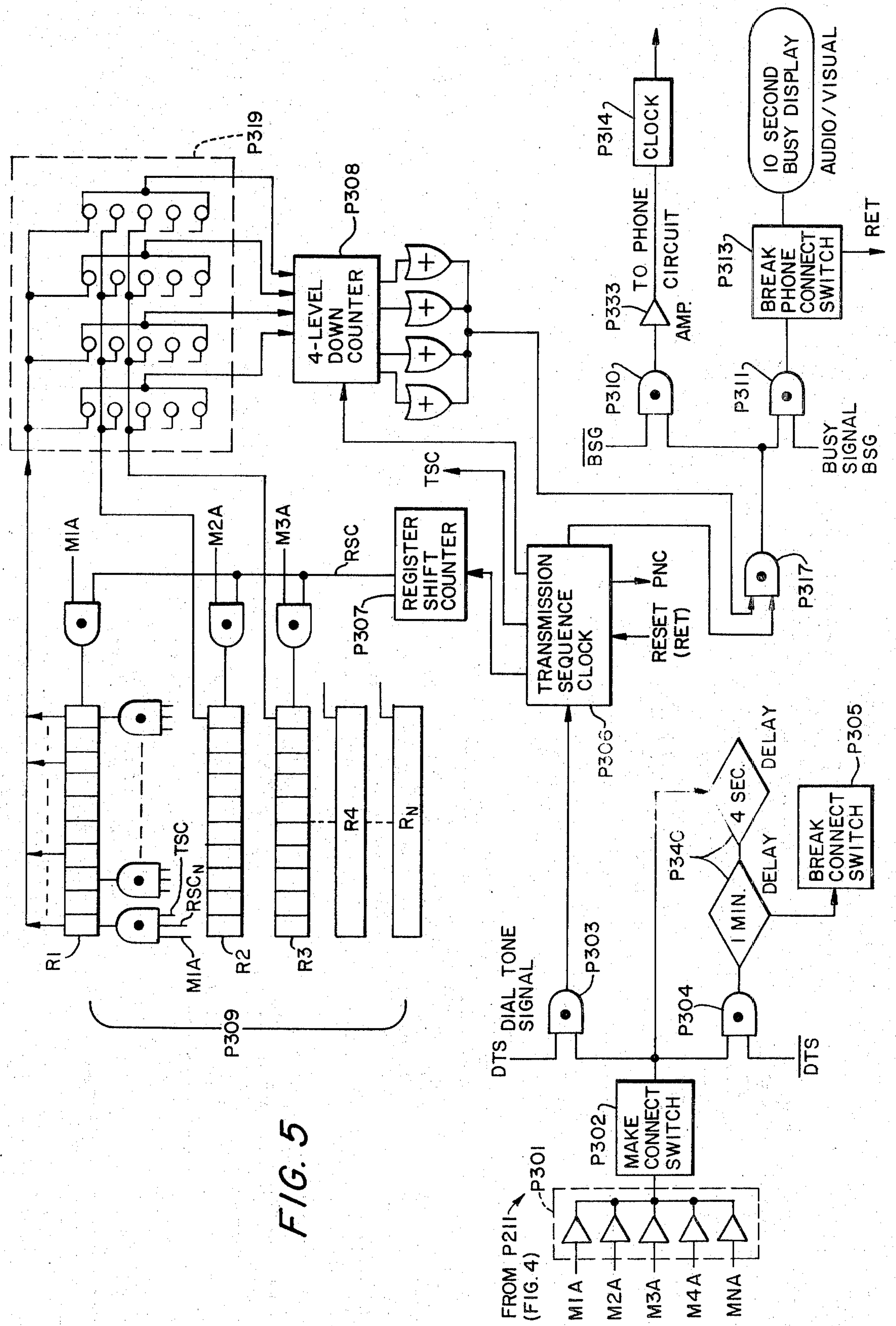

A try-again pulse (TAP) results when all of the inputs of any of the AND gates P213–P218 are high; this TAP pulse is applied to AND gate P226. Similarly, TAP pulses for modules 2, 3, 4 and N are represented by M2A, M3A, M4A, and MNA pulses which are applied to AND gate P223 and enable AND gate P223 when they are low; the output signal from AND gate P223 is applied to the input terminal of AND gate P226. PNC is a signal generated from P306 (FIG. 5). This signal is generated to "permit next call," and is necessary because, if the dialing process is discontinued (circuits busy etc), the sequence clock must be allowed to continue its cycle before the next call is made.

With the TAP pulse applied to AND gate P226 high and with the PNC signal also high, and the MNA signals of the other module low AND gate P226 will be enabled; the output signal from AND gate P226 is applied to AND gate P222 which is enabled if signals TRD, M1R, and PNC applied to OR gates P221 are low. However, if any of signals TRD, M1R, and PNC is high, then the inverter P225 will apply a low signal to AND gate P227 which will disable AND gate P227 and hence the latching circuit P211 will be disabled and the output signal from latching circuit P211 will be low. Therefore, the function of the latching circuit P211 is to inhibit the try-again pulse TAP for that module if, (a) the terminal receiver at the other end of the line is busy, i.e., TRD which is the terminal response detector signal is high, or (b) if there is a termination in the call sequence because of no answer to the ring of the telephone at the other end, i.e., PNC which is a signal for "Permit next call," (See discussion supra) is high; or if M1R is high, where the signal M1R, represented by the Boolean algebra expressions $M1R = SO1, + \overline{PCS} \cdot \overline{SN1}$. M1R is a RESET impulse to set module 2 register to $\phi$.

The flip flop P209-0 through P209-5 may be reset through reset signal RSO-RSN in accordance with the following Boolean expressions:

RSO = 1
RS1 = SO1 + CR2 + CR3 + CR4 + . . . CRN + TRD · M1A
RS2 = SO1 + CR1 + CR3 + . . . CRN + TRD · M1A
RS3 = SO1 + CR1 + CR3 + CR4 . . . CRN + TRD · M1A
RS4 = SO1 + CR1 + CR2 + CR4 . . . CRN + TRD · M1A
RSN = SO1 + CR1 + CR3 + CR2 . . . CRN + TRD · M1A where SO1 is a signal generated by pressing push button P112 to the off position and signals CR1 – CRN are generated as previously described and TRD is the terminal response detector signal. These expressions state set TN (P209–0 to P209–5) to low when the module is turned off (SO1 is high), whe another time interval is chosen (CRN) when a signal has been tried (M1A) and a response TRD is detected. Therefore if the receiver of the phone dialed is uncradled the automatic redialing will cease and will not resume even after the receiver of the phone dialed is recradled.

Referring now to FIG. 5, the generated pulse M1A, M2A, etc., from the appropriate module, will electronically connect the telephone handset into the switching system via make connect switch P302. The system then tests for a dial tone, DTS signal. If there is no dial tone signal DTS, AND gate P304 is enabled and permits a 4 second delay through delay line 340 and the system attempts to make connection again, and this procedure is repeated for a total of one minute. If there is no dial tone after one minute, the connection is broken through disconnect switch P305. Upon the detection of a dial tone signal, DTS, AND gate P303 will be enabled which will activate a transmission sequence clock P306, which is nothing more than a pulse generator.

The sequence clock P306 controls a shift register counter P307 which is essentially similar to digit counter pointer P106 whose function is to point to the 4-bit shift register comprising the module register P309. (This module register P309 corresponds to the module register P105 of FIG. 3.) The number stored in the module register P309 whether it be R1, R2, or RN module, is read out when the appropriate gate is enabled. The operation is essentially the reverse of entering a number into a module register described supra in relation with FIG. 3. For example, if module R1 is selected by enabling pulse MIA the appropriate 4-bit shift register within the module register R1 is selected by the register shift counter P307 which supplies the appropriate RSC count signal from 1 through 11. With the appropriate 4-bit shift register within the module register R1 thus selected, it is read out by pulse signal TSC from the transmission sequence clock. (Only a portion of this logic is shown on module R1.) Each 4-bit shift register read out is temporarily stored in temporary storage P319 which may be nothing more than a serial-in-parallel-out shift register. The number temporarily stored in temporary storage P319 is a binary coded decimal and it is decoded and transformed into serial pulses utilizing decode unit P308 which comprises a 4-level down counter in combination with AND gate P317 and transmission sequence clock P306. Down counters are described in Pages 4–7 of application memos published 1968 by Signetics Corp., 811 East Arques Ave., Sunnyvale, Calif. The number in temporary storage unit P319 is applied to the 4-level down counter P308 whose separate cells are OR'ed to AND gate P317. Pulses from the transmission sequence clock P306 are applied to both the 4-level down counter P308 and AND gate P317. As long as 4-level down counter P308 has any of is cells high, this high signal will be applied as one input to AND gate P317 which in turn will be enabled whenever it receives a pulse from transmission clock P306 and will permit the pulse to go through. For example, assume that the number 9 which in binary coded decimal is 1001 is in the 4-level down counter P308. The first pulse will decrement the count to 1,000 or 8, and so on, until after a total of 9 pulses have resulted all the cells will be zero or low and AND gate P317 will be disabled and no more pulses from transmission clock P306 will pass through. This process is repeated over and over, the shift register counter P307 pointing to the correct 4-bit shift register within the module register $R_1$, reading out the contents of the specific 4-bit shift register printed to and decoding the binary coded number into pulses until the entire number is thus dialed. Once the number is dialed, there will be either a ring on the other end, or a busy signal. If there is a busy signal, at the other end of the line, AND gate P310 is not enabled, since the busy signal PSG will be high, but AND gate P311 is enabled and a break phone connect switch P313 is activated which flashes a 10 second busy display signal. Display is via a light blinking on the same on/off, switch for the appropriate module. The audio in it is simply a buzzer within the box. (See FIG. 5 "Busy Display"). Moreover, a terminal response detector (not shown) will issue a signal TRD which is applied to OR gate P221 of FIG. 4 which in turn terminates the call; however, it does not destroy the contents of the storage register. Another signal RET is issued when break phone switch P313 is activated to transmission sequence clock P306 which resets the clock. If on the other hand there is no busy signal on the line, then AND gate P310 is enabled and AND gate P311 is disabled and the signals are amplified through amplifier P333. If after a period of ringing without an answer at the other end, the phone is disconnected as with break phone switch P313. The clock P314 simply allows the terminal phone to ring for $x$ seconds (for example 60). If no TRD (called phone not lifted from cradle) within that time, transmission sequence clock P306 is reset and the phone is electronically disconnected.

When the receiver is uncradled on the other end of the line a response detector causes an impulse TRD and also an audio visual signal (ring and blinking light on same OFF/ON switch of proper module. (See P315, FIG. 5). The TRD signal is necessary to reset the timing flip-flops P209-0 to P209-5. Note it does not cause the stored number to be set to blanks.

Having shown and described one embodiment of the invention, those skilled in the art will realize that many variations and modifications can be made to produce the described invention and still be within the spirit and scope of the claimed invention.

What is claimed is:

1. An automatic telephone redial device for use with a telephone communication network for automatically redialing a predetermined telephone number at random or at a preselected one of a plurality of time intervals comprising:

a. a local electronic memory for storing a predetermined number;
b. encoder means coupled to said local electronic memory for converting groups of serial electric signals representative of digital numbers to groups of electric signals representative of binary coded decimal numbers;
c. coupling means for coupling said local electronic memory to a telephone switching network;
d. transmitting means coupled to said coupling means for transmitting the stored number in said local memory to said telephone switching network;
e. time-interval-select means coupled to said transmitting means for selecting one of a plurality of time intervals;
f. first disconnect means coupled to said transmitting means and to said time-interval-select means for disconnecting said local electronic memory from said telephone switching network when a busy signal is detected in said telephone switching network;
g. clock interval timing means coupled to said transmitting means and to said time-interval-select means for automatically transmitting and retransmitting the stored number in said local electronic memory to said telephone switching network at a preselected one of a plurality of time intervals, whereby the predetermined number selected for automatic dialing is automatically dialed and, upon detection of a busy signal, is redialed after the preselected time interval has elapsed.

2. An automatic telephone redial device as recited in claim 1 including saving means coupled to said local electronic memory for preserving indefinitely the number in said local electronic memory.

3. An automatic telephone redial device as recited in claim 2 including clearing means coupled to said local electronic memory for clearing said local electronic memory of any information stored therein.

4. An automatic telephone redial device as recited in claim 1 wherein said encoder means comprises a four level binary counter.

5. An automatic telephone redial device as recited in claim 1 wherein said transmitting means comprise transmission sequence clock means coupled to said local electronic memory means for providing sequential clock pulses, and decoding means coupled to said transmission sequence clock means for converting the groups of electric signals representative of binary coded decimal numbers to groups of serial electric signals representative of digital numbers.

6. An automatic telephone redial device as recited in claim 5 wherein said decoding means comprises a combination of a four level binary counter coupled to an AND gate, said combination responsive to clock pulses from said transmission sequence clock means.

7. An automatic telephone redial device as recited in claim 1 including clock means coupled to said transmitting means for transmitting the stored number in said local electronic memory on said telephone switching network at a preselected time of day or night.

8. An automatic telephone redial system for use with a telephone communication network for automatially dialing a predetermined telephone number at random or at a preselected one of a plurality of time intervals comprising:

a. a local electronic memory for storing a predetermined number;
b. encoder means coupled to said local electronic memory for converting groups of serial electric signals representative of digital numbers to groups of electric signals representative of binary coded decimal numbers;
c. coupling means for coupling said local electronic memory to a telephone switching network;
d. transmitting means coupled to said coupling means for transmitting the stored number in said local memory to said telephone switching network;
e. time-interval-select means coupled to said transmitting means for selecting one of a plurality of time intervals;
f. first disconnect means coupled to said transmitting means and to said time-interval-select means for disconnecting said local electronic memory from said telephone switching network when a busy signal is detected on said telephone switching network; and,
g. second disconnect means coupled to said transmitting means and to said time-interval-select means for disconnecting said local electronic memory from said telephone switching network within a predetermined time interval when said switching network fails to connect to the telephone of the number dialed.

9. A method of automatically redialing a telephone number comprising the steps of:

a. dialing a predetermined number producing groups of electronic pulses representative of the decimal numbers dialed;
b. encoding said groups of electronic pulses representative of the decimal number, into binary coded decimal numbers;
c. storing said binary coded decimal numbers in a local memory;
d. electronically coupling the local memory with a telephone switching network;
e. automatically decoupling the local memory from the telephone switching network when the telephone of the number dialed is busy;
f. selecting one of a plurality of predetermined time intervals for automatically redialing the predetermined number;
g. automatically transmitting and retransmitting at a preselected one of a plurality of time intervals the number stored in the local memory to the telephone switching network, whereby the predetermined number selected for automatic dialing is automatically dialed and, upon detection of a busy signal is automatically redialed at a preselected one of a plurality of time intervals.

10. The method of automatically redialing a telephone number as recited in claim 9 including the step of decoding the stored binary coded decimal number into groups of electronic pulses representative of the binary coded decimal number.

11. A method of automatically redialing a telephone number comprising the steps of:

a. dialing a predetermined number producing groups of electronic pulses representative of the decimal numbers dialed;
b. encoding said groups of electronic pulses representative of the decimal number into binary coded decimal numbers;
c. storing said binary coded decimal numbers in a local memory;
d. electronically coupling the local memory with a telephone switching network;
e. transmitting the number stored in a local memory to the telephone switching network;
f. decoding the stored binary coded decimal number into groups of electronic pulses representative of the binary coded decimal number;
g. automatically decoupling the local memory from the telephone switching network after a predetermined time interval when the telephone of the number dialed is not answered;
h. selecting one of a plurality of predetermined time intervals for automatically redialing the predetermined number; and,
i. automatically redialing the predetermined number at said selected one of a plurality of predetermined time intervals.

12. A method of automatically redialing a telephone number as recited in claim 10 including the step of automatically dialing a predetermined number at a predetermined time.

13. An automatic telephone redial system as recited in claim 8 including saving means coupled to said local electronic memory for preserving indefinitely the number in said local electronic memory.

14. An automatic telephone redial device as recited in claim 13 including clearing means coupled to said local electronic memory for clearing said local electronic memory of any information stored therein.

15. An automatic telephone redial device as recited in claim 8 wherein said encoder means comprises a four level binary counter.

16. An automatic telephone redial device as recited in claim 13 wherein said transmitting means comprise transmission sequence clock means coupled to said local electronic memory means for providing sequential clock pulses, and decoding means coupled to said transmission sequence clock means for converting the groups of electric signals representative of binary coded decimal numbers to groups of serial electric signals representative of digital numbers.

17. An automatic telephone redial device as recited in claim 16 wherein said decoding means comprises a combination of a four level binary counter coupled to an AND gate, said combination responsive to clock pulses from said transmission sequence clock means.

18. An automatic telephone redial device as recited in claim 8 including clock means coupled to said transmitting means for transmitting the stored number in said local electronic memory on said telephone switching network at a predetermined time of day or night.

19. A method of automatically redialing a telephone number as recited in claim 11 including the step of automatically dialing a predetermined number at a predetermined time of day.

* * * * *